Figure 1:
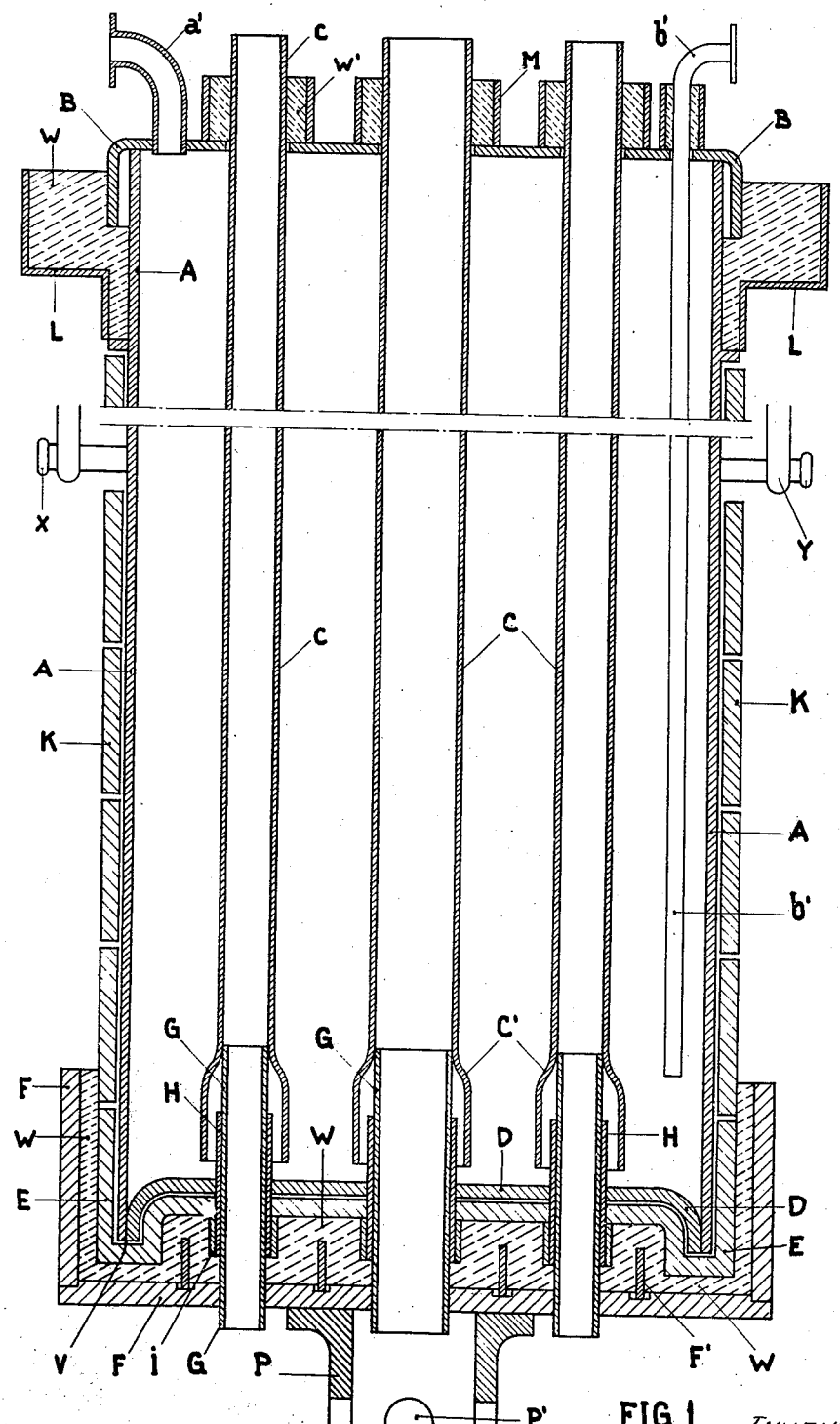

Nov. 29, 1938.  C. P. BRATASIANU  2,138,321
SPECIAL RETORT AND APPARATUS FOR REFINING RAW MATERIALS
IN SOLID, LIQUID, VAPOR, AND GASEOUS FORM
Filed July 9, 1937   5 Sheets-Sheet 1

INVENTOR
C. P. Bratasianu
BY
ATTORNEY

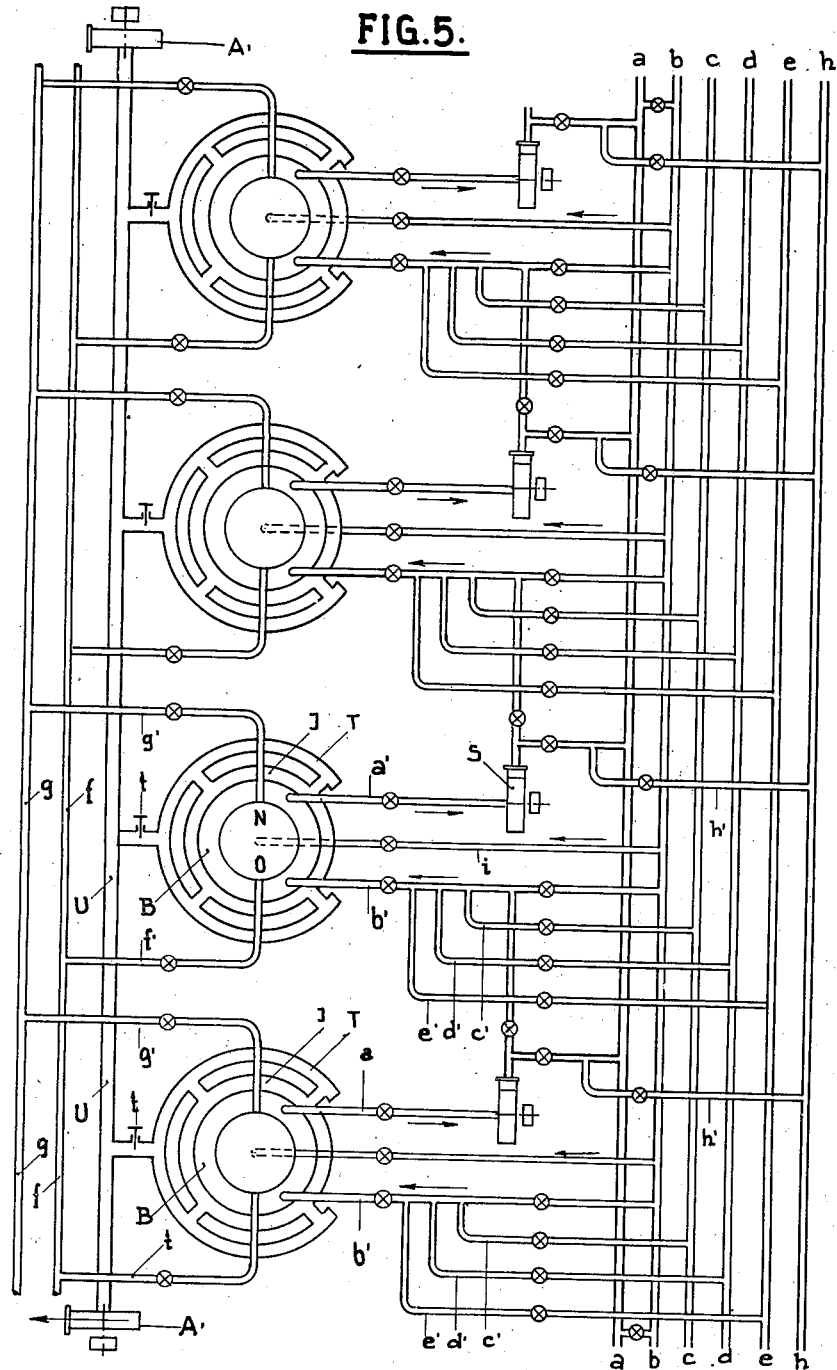

Patented Nov. 29, 1938

2,138,321

UNITED STATES PATENT OFFICE 2,138,321

SPECIAL RETORT AND APPARATUS FOR REFINING RAW MATERIALS IN SOLID, LIQUID, VAPOR, AND GASEOUS FORM

Constantin Paul Bratasianu, Craiova, Rumania

Application July 9, 1937, Serial No. 152,867
In Rumania July 18, 1936

10 Claims. (Cl. 263—29)

The invention relates to a retort and to the apparatus necessary for its functioning for purifying and refining crude materials in general, these materials being treated either individually or mixed in various proportions in view of a predetermined end, and being in a liquid, solid, vapor or gaseous form, in a cycle of successive operations which can be carried out in one or more of these retorts connected together by the said apparatus. The employment of this latter permits the intensification of the refining of the said crude materials in no matter what phase and under different conditions of temperature, pressure, reverse reactions and catalytic effects.

A vertical cylindrical retort according to the present invention is provided with a number of heating tubes which traverse the interior thereof, and are easily removable when desired. These tubes are rendered tight to prevent the passage of gas from the interior of the tubes to the interior of the retort or vice versa.

There is also provided according to the present invention an apparatus for treating crude mineral ores and/or solid carbonaceous combustible materials and/or hydrocarbons in a continuous process which comprises a plurality of such retorts and means for heating them and also means for removing the exhaust gases.

The characteristics of the retort and the apparatus which are the object of the present application permit however, the intensification to a considerable extent of the means of refining and purifying of crude materials, in view of the fact that these characteristics permit the employment of much higher temperatures while protecting the apparatus from deformation and corrosion, in such a manner that it can be generally used.

As several of the retorts according to the invention can be installed individually in the recesses or wells of a masonry furnace, and as they can be connected together by means of a specially studied apparatus, retorts containing fresh material can be introduced into the uninterrupted cycle of purification operations and as one can introduce during their functioning, in each retort, chemical agents in gaseous, vapor or liquid form, such as water and hydrocarbons, one can produce, as desired, reversible reactions by differences of temperature, the retorts being heated in a manner independent of each other. Certain catalytic reactions can be caused in the cycle of successive operations by differently charging certain of the retorts; intensive hydrogenations can, in fact, be carried on in the retorts by effecting a continuous supply of CO and H by water gas. The reactions take place with a speed heretofore unknown owing to the fact that some of the retorts can be maintained in a continuous manner in the cycle of refining operations, charged with masses of carbonaceous incandescent material.

In the accompanying drawings there is shown by way of example in:—

Figure 2:
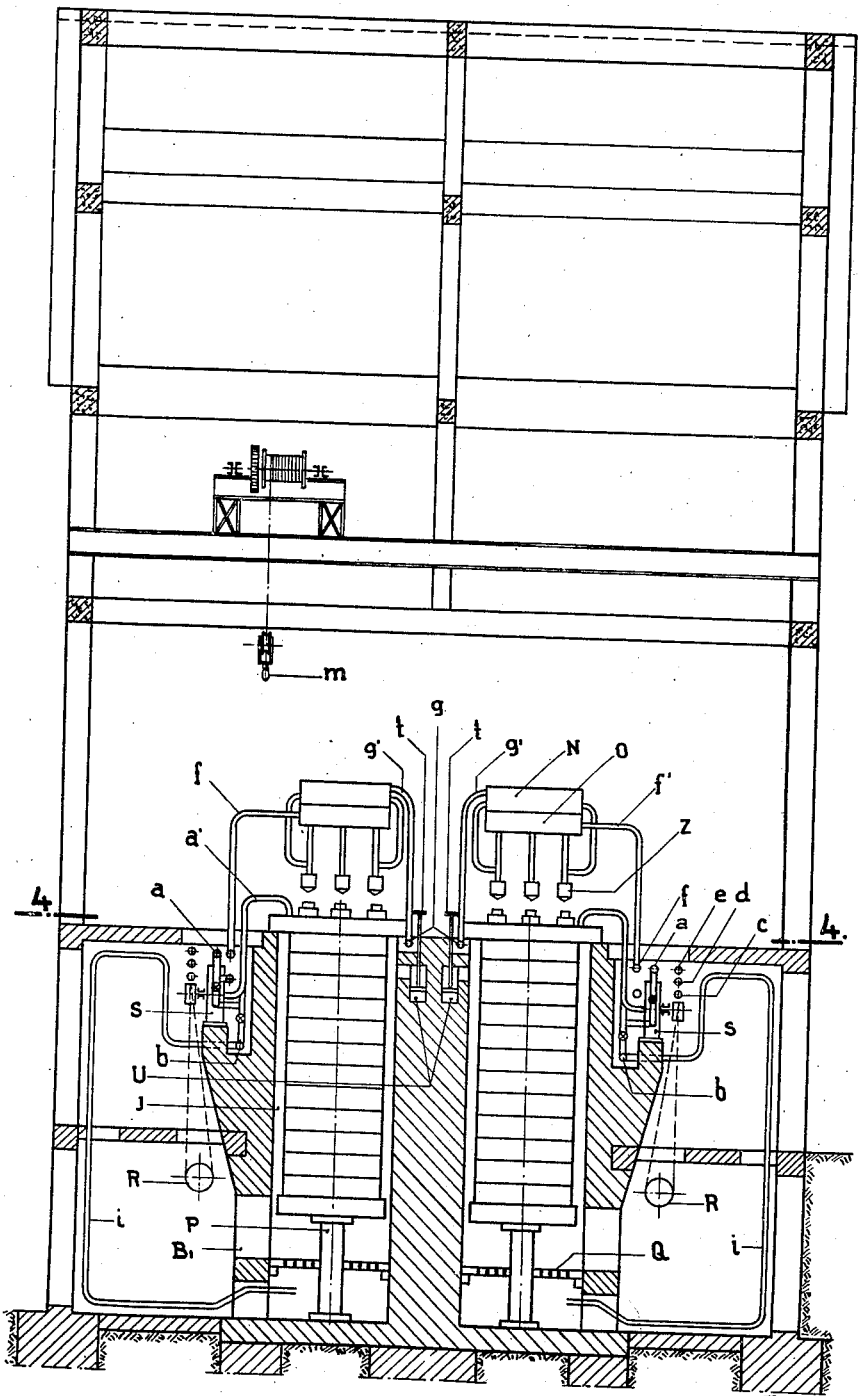
Figure 4:
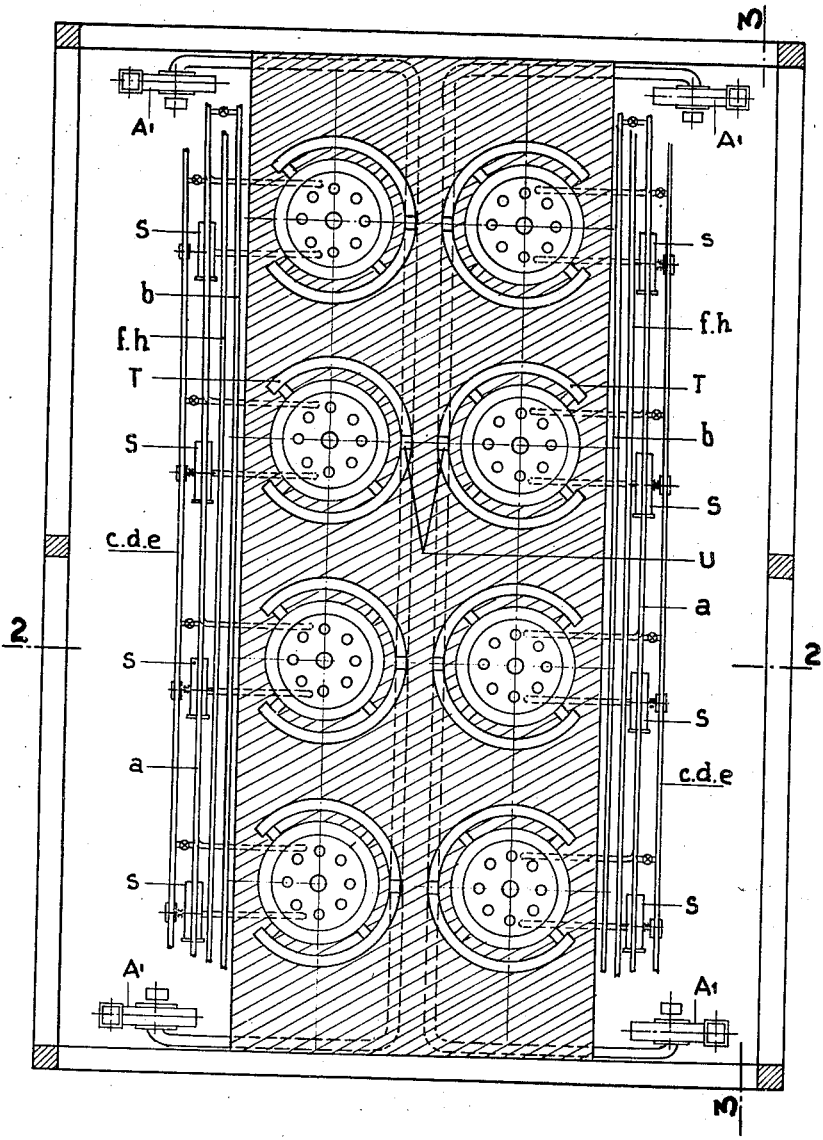

Fig. 1 a vertical axial section of a retort,

Fig. 2 a vertical transverse section of a complete apparatus along the line 2—2 of Fig. 4.

Figure 3:
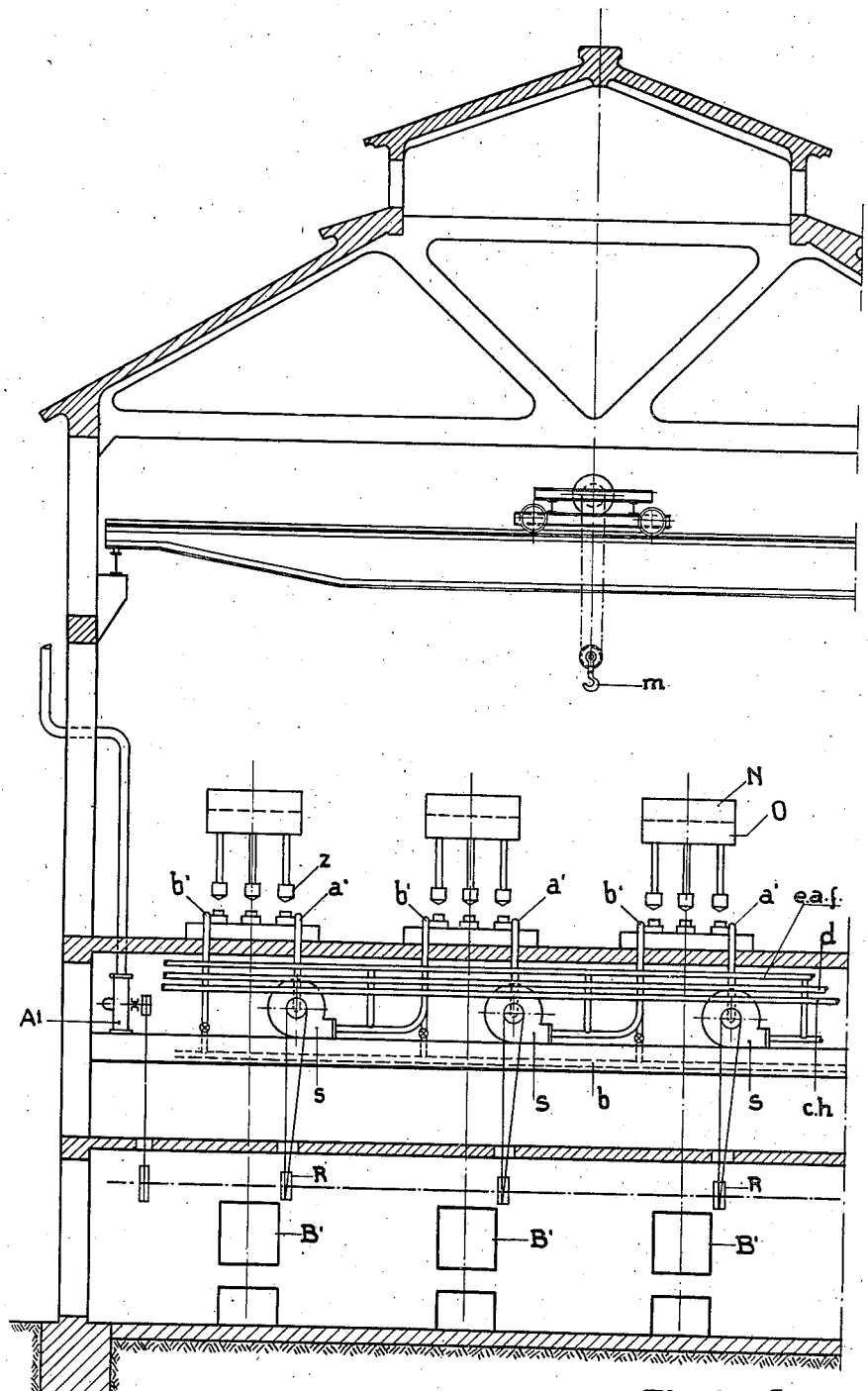

Fig. 3 a vertical longitudinal section of the same apparatus along the line 3—3 of Fig. 4.

Fig. 4 a horizontal section of the same apparatus along the line 4—4 of Fig. 2.

Fig. 5 a diagram of the different conduits of the apparatus.

Before describing the construction of the retort, one of its characteristics must be mentioned; that is, in spite of its being intended to resist temperatures up to 1000° C., it is made of iron.

In these conditions it has been necessary to take into account four very important factors as much for the conservation of the retorts as for the success of the reactions which take place in the retorts.

It is necessary for the retort to be able to expand freely without deforming or deteriorating, it is necessary that the most important parts at least should not be reached by the flames and by the most intense heat, it is necessary that these same parts should not be accessible to or that they should be protected from the corrosive action of acid gases and it is finally necessary for the joints between the different parts to be tight in respect of escape of gas or entry of air.

The retort has a cylindrical body A made of strong sheet iron or steel of at least 10 mm. thickness and stronger for retorts of which the capacity can go up to 100 tons of such materials such as ore, solid carbonaceous matter, heavy liquid hydrocarbons and the like.

The retort is surrounded with a series of individual rings of cast iron K made of sections and bolted together. These rings form a jacket which allows the cylindrical body a certain expansion but prevents it from collapsing and further protects it from direct contact with the acid and corrosive gases which circulate around the exterior of the retort.

D is the base of the cylindrical body of the retort. It is made of sheet iron at least 20 mm. thick. It is so curved that its convex face is towards the interior of the retort, and to allow it to expand, it is united to the cylindrical body of the retort by welding along the exterior edge V. To reinforce this base, it is covered by a second base E of cast iron. This is made in independent sections to allow it to expand and its shape is such that it conforms with the exterior form of the iron base D and also embraces the lower portion of the cylindrical body, thus replacing the last cast iron ring. This reinforcing base is maintained against the base proper D of the retort by sleeves I which will be described later.

The retort has a cover B of sheet iron resting simply over the cylindrical body. The edge of this cover projects into an annular trough L which surrounds the top of the retort and is filled with sand W.

Heating of the retort is effected by means of a certain number of movable iron tubes C. The upper extremities of these tubes pass freely through the cover B and the tubes extend vertically into the retort near to the base D. The tubes are distributed over the whole cross-section of the retort and as they are surrounded by the crude materials to be treated, which must be penetrated by the heat emitted from these tubes, at the instant of distribution over all the cross section of the retort, account must be taken of the distance at which emission of heat can take place. This distance being about 15 cms. the tubes will be so arranged that they have a distance of approximately 30 cms. between them.

Since the heating tubes C should be arranged to register with the base D of the retort in a removable manner in order to allow them to be easily withdrawn towards the top after having removed the cover to thus facilitate discharging the retort, registering tubes H are provided according to the invention. These are short lengths of iron or steel tube permanently fixed in the base D, being welded to both faces of the base. The above mentioned sleeves I are applied hot over these registering tubes H, the object being to maintain the reinforcing base against the retort base. To allow the lower ends of the heating tubes C to be applied to the registering tubes H, these extremities are enlarged at C'.

As it is necessary to protect the registering tubes H on one hand against the heat which is produced in the heating tubes C, and as it is necessary on the other hand to effect a gas-tight registering, there are provided, according to the invention, protective tubes within the registering tubes H. These are short lengths of tube G introduced and adjusted within the tubes H and having their extremities passing beyond the extremities of these latter and are intended to be scrapped when they have deteriorated as a result of the heat. The tightness of the joint between the tubes G and H is obtained by surrounding the tubes H and G with refractory clay before thrusting the tube C, or alternatively its enlarged portion C', down towards the base. In order that the heating tubese C may pass tightly through the cover B of the retort, this cover carries sheet iron rings M, welded together and surrounding the heating tubes. By introducing sand W' into these rings tightness is ensured and all escape of gas or entry of air through the cover of the retort is prevented. Since the joints of the cover and of these tubes are filled with sand, they fulfil at the same time the function of safety-valves and avoid the establishment of any excess pressure which might give rise to an explosion in the interior of the retort.

The retort constructed in the manner described is placed in a recess or in a well made in a masonry furnace. The diameter of the well is greater than the diameter of the retort with its rings K, so that there results an annular space J for the passage of the ascending hot gases. The retort is maintained in this well by a protective base plate F, which is situated on the bottom of the well and keeps the reinforcing base E from being attacked by the flames or by the corrosive gases. This base plate is similarly constituted of several sections which permit its expansion, and it is supported by a column P having lateral windows P' for the passage of the hot gases coming from the central heating tube. Before placing the retort in the well, the protective base plate F is filled with refractory clay W. Rings F' serve to reinforce the base plate F and to spread the clay between this protecting base plate F and the reinforcing base E of the retort. The protective tubes G mentioned above extend beyond the base plate F towards the exterior in such a manner that the heating gases coming from the tubes C cannot come into contact with the base and are spread in the space J around the outside of the retort to heat it from the exterior, which heating can be increased by feeding gas through the passages $i$ mentioned below.

From what has preceded it has been evident what precautions are necessary to protect the retort, and above all the base of the retort, which holds a large quantity of heat when it is charged with dozens of tons of carbonaceous material to be coked and with mineral to be purified and carburized.

The heating of the retort similarly presents special difficulties, particularly because of the expansions and the possible losses of vapors or gases, especially when large masses of carbonaceous material are being treated, mixed with heavy liquid hydrocarbons and with minerals in order to purify them and to prepare metallurgical coke.

The heating of the retorts is effected by tubes C, by injecting therein compressed air, gas and combustible liquids, or even light liquid hydrocarbons resulting from the treatments of the heavy hydrocarbons in the retorts.

Experiment has shown that retorts constructed in the manner described, in which the vapors and the gases evolved in the interior are drawn off at the top through a tube $a'$ by blowers S and in which the heating gases in the tubes C are caused to flow towards the bottom, there is no possible loss of gas from the base of the retort. Experiment has further shown that the corrosion of the retort at its interior and the corrosion of the heating tubes can be avoided by a coating of cracking graphite, either alone or mixed with refractory clay. Such a covering against corrosion can be easily maintained because the retorts, owing to their manner of functioning, can be controlled at very short intervals. As far as the interior of the heating tubes C is concerned, it can be coated with clay or lime, even during operation. Furthermore, the wear of the heating tubes constitutes the only expense necessary for maintaining the retort and their repair at the portions, which are most attacked by the heat, is easily effected by welding.

The heat in the interior of the retorts being conveyed by the vapors and the gases which circulate from one retort to another, and above all around the heating tubes and the length of the cylindrical body in the interior of the retorts, the material treated does not adhere thereto, so that the retorts of reduced diameter, like those shown in the drawings, after having raised the removable fuel injectors, the cover B and the trough L, may very easily be discharged by withdrawing them from their wells by the crane m which, by means of hooks Y, takes them by the trunnions X and reverses them about the trunnions. When the retorts are larger, lateral doors are provided in their walls and corresponding doors, not shown in the drawings, are provided in the masonry of the furnace. The cooling of the retorts can take place in situ, by opening the doors B₁ of the furnace below the retorts, in order that fresh air may circulate by rising through the tubes C which have served for heating. After having removed the cover of larger retorts, the heating tubes are easily withdrawn by the crane, because the cooled and contracted treated materials do not adhere to these tubes and to the walls of the retort. During the rise of the cover, the sand of the sealing W' falls through the heating tubes C.

In this manner coke of superior quality is manufactured, it being no longer necessary to spray it with water as formerly.

As has been mentioned above, several retorts are placed in a special masonry furnace where they are connected together by passages a and b in which the gases and the volatile products circulate from one retort to the other, and which allows them to be enriched with light products, resulting in the purification of even the hydrocarbons or heavy residues submitted to the treatment. Finally the entire apparatus and its installation is made with a view to a certain method of operating which permits a continual refining in successive stages with the possibility of feeding fresh solid matter as well as chemical agents introduced from the outside in the form of gas, vapor or liquid, such as water, or hydrocarbons in the cycle of reactions, even during operation. The furnace is constituted by a central structure of masonry as can be seen from the drawings, and possesses the wells in which the retorts are individually placed, having no other connection between them except the common exhaust channels U for asperation to the blowers A₁ for gases burned in the interior of the retorts in the tubes C, which combustion can eventually be completed in the space around the retorts with the assistance of supplementary gas introduced as has been mentioned above by the passage i below the grille Q placed beneath the retort, to which grille access is obtained through the door B₁ of the furnace and where a small quantity of incandescent carbon can be maintained in order to prevent the accumulation of gas beneath the retort which might not be ignited and could possibly give rise to explosions.

Around the upper part of each retort there is arranged within the furnace an arcuate channel T by which the gases burnt in the interior and around each retort are drawn away towards the main channel U, according to the heat necessary to be given to each retort separately. In the case of an accident to one retort, its channel T is immediately closed by its associated controlling device t as is shown in the drawings, and the burnt gases are immediately withdrawn in the opposite direction by the tubes C which normally serve for heating the retorts, so that fresh air can no longer enter these tubes, the fire is immediately extinguished and all possibility of accident is completely excluded, no matter how large an amount of carbonaceous material and hydrocarbons may be in the retort at the moment of negligence on the part of the operators.

On the main structure of the furnace there is mounted a transmission device R which operates the blowers S which circulate the gases and the vapors, either directly from one retort to another, by drawing the volatile products which are beneath the cover of the retort through the tube a' and returning them by tube b', which descends as far as the base of the succeeding retort, or by transferring these products from any one retort to any other retort through the intermediary of the passages a and b, or again by sending all these products or part thereof through a passage h towards the condensers. The passages a and b or the tubes a' and b' are particularly important when it is necessary to isolate a retort, at the same time stopping the corresponding blower, to replace this retort by another charged with fresh material or to empty a retort in situ by means of its lateral door and that door formed in the body of the furnace masonry.

On this same body there are mounted all the other passages which serve for supplying the retorts. The passage c and the tube c' serve to supply the retorts with water or with steam introduced at their base; the passage d and the tube d' serve for supplying gas to the base of the retorts and the passage e and the tube e' serve to send the heavy residues to the bases of the retorts. A series of valves shown in the diagram of the passages serves to feed the tube b' which penetrates to the bases of the retorts with all the products which can be introduced through the passages a, b, c, d and e, directing any overflow from the passage a to the condensers through the passage h.

The gas or liquid fuel and air distributors O and N feed the injectors Z which heat the tubes C and they fulfil the function of special carburettors which effect the metering of the mixture to be injected, which is composed of gas coming from the distributor O and which are either gases from a gas producer, or permanent gases resulting from purification operations carried out in the retorts themselves. These distributors regulate the enriching of the mixture to be burnt as a function of the variations in temperature necessary in the retorts by adding thereto light hydrocarbons and by varying their level in the gas distributor O.

The passages f and g feed through the tubes f' and g' the distributors O and N, which are raised by a crane during the charging or discharging of the retorts, since they are simply placed on the covers of the retorts and maintain themselves there by their own weight.

The retort described herein is useful for carrying out on an industrial scale the first stage of the process of purifying or refining crude carbonaceous solid materials, ores, heavy hydrocarbons and petroleum and tar distillation residues which is disclosed in my prior patent application, filed June 11, 1934, Serial No. 730,081.

I claim:

1. A retort for use in the treatment of raw materials, such as crude ores and/or solid carbonaceous combustibles and/or hydrocarbons, said retort comprising a vertical cylindrical wall adapted to resist temperatures up to 1000° C. under atmospheric pressure and comprising a plurality of multi-part heating tubes extending therethrough longitudinally thereof, said retort being provided with a cover at its top and with a base plate at its bottom, said heating tubes being open at both ends thereof, extending out of the said cover at one end and out of the base plate at the other end, and the greater portion of each heating tube being easily withdrawable upwardly without the necessity of disconnecting or destroying any mechanical assembling member, and means for heating said retort by injecting downwardly into said tubes and burning therein a mixture of air and gas.

2. A retort as defined in claim 1, and sealing means adjacent the base plate and cover of the retort for sealing the latter and for preventing gases from passing from the interior of the tubes to the interior of the retort and vice versa.

3. A retort as defined in claim 1, said heating tubes comprising a short portion arranged in and extending through said base plate and a long portion extending from said short portion to and through said cover, the lower end of said long portion comprising an enlargement fitting snugly over said short portion.

4. A retort for use in the treatment of raw materials, such as crude ores and/or solid carbonaceous combustibles and/or hydrocarbons, said retort comprising a vertical cylindrical wall adapted to resist temperatures up to 1000° C. under atmospheric pressure and comprising a plurality of multi-part heating tubes extending therethrough longitudinally thereof, said retort being provided with a cover at its top and with a base plate at its bottom, said heating tubes being open at both ends thereof, extending out of the said cover at one end and out of the base plate at the other end, and the greater portion of each heating tube being easily withdrawable upwardly without the necessity of disconnecting or destroying any mechanical assembling member, means for heating said retort by injecting downwardly into said tubes and burning therein a mixture of air and gas, a series of individual sectional rings of cast iron surrounding said wall, and a reinforcing plate exteriorly of and conforming in shape to said base plate.

5. A retort for use in the treatment of raw materials, such as crude ores and/or solid carbonaceous combustibles and/or hydrocarbons, said retort comprising a vertical cylindrical wall adapted to resist temperatures up to 1000° C. under atmospheric pressure and comprising a plurality of multi-part heating tubes extending therethrough longitudinally thereof, said retort being provided with a cover at its top and with a base plate at its bottom, said heating tubes being open at both ends thereof, extending out of the said cover at one end and out of the base plate at the other end, and the greater portion of each heating tube being easily withdrawable upwardly without the necessity of disconnecting or destroying any mechanical assembling member, means for heating said retort by injecting downwardly into said tubes and burning therein a mixture of air and gas, a tube on said cover for withdrawing volatile products from beneath the cover, and another tube for feeding gases or the like to the bottom of the retort.

6. Apparatus for refining raw materials comprising a masonry furnace including a plurality of wells, a retort-supporting column in each well, a protective base plate on said column, a retort on said base plate and a layer of refractory clay between said retort and base plate, and means interconnecting each retort with every other retort.

7. Apparatus for refining raw materials comprising a masonry furnace including a plurality of wells, a retort-supporting column in each well, a protective base plate on said column, and a retort on said base plate and a layer of refractory clay between said retort and base plate, means interconnecting each retort with every other retort, each said retort comprising a plurality of heating tubes extending therethrough, and a removable heating device above each retort, said heating device comprising a receiver for compressed air, a receiver for fluid fuel and an injector adapted to direct a flame downwardly through said heating tubes.

8. Apparatus for refining raw materials comprising a masonry furnace including a plurality of wells, a retort-supporting column in each well, a protective base plate on said column, and a retort on said base plate and a layer of refractory clay between said retort and base plate, means interconnecting each retort with every other retort, each said retort comprising a plurality of heating tubes extending therethrough, and a removable heating device above each retort, said heating device comprising a receiver for compressed air, a receiver for fluid fuel and an injector adapted to direct a flame downwardly through said heating tubes, said furnace comprising a recess beneath each retort, and a grille in each recess for maintaining thereon incandescent material beneath each retort to prevent accumulation of unburnt combustible gases.

9. Apparatus for refining raw materials, as defined in claim 8, said furnace comprising a common exhaust channel for combustion gases from said retorts, means for cutting off each retort from said channel, whereby after heating has ceased, each retort remains separated to cool the treated material in situ without interrupting the operation of the other retorts.

10. Apparaus for refining raw materials comprising a masonry furnace including a plurality of wells, a retort-supporting column in each well, a protective base plate on said column, a retort on said base plate and a layer of refractory material between said retort and base plate, a system of conduits interconnecting each retort with every other retort, whereby the gases and volatile products from one retort may be fed to any other retort or retorts, and means for supplying said retorts with chemical reagents from the exterior.

C. P. BRATASIANU.